(12) United States Patent
Yeakley

(10) Patent No.: US 11,727,231 B2
(45) Date of Patent: *Aug. 15, 2023

(54) ENCODED INFORMATION READING TERMINAL CONFIGURED TO PRE-PROCESS IMAGES

(71) Applicant: Honeywell International Inc., Charlotte, NC (US)

(72) Inventor: Daniel Yeakley, Monroe, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/653,922

(22) Filed: Mar. 8, 2022

(65) Prior Publication Data

US 2022/0198170 A1      Jun. 23, 2022

Related U.S. Application Data

(63) Continuation of application No. 17/118,793, filed on Dec. 11, 2020, now Pat. No. 11,301,661, which is a continuation of application No. 15/409,590, filed on Jan. 19, 2017, now Pat. No. 10,885,291, which is a
(Continued)

(51) Int. Cl.
| | | |
|---|---|---|
| *G06K 7/14* | (2006.01) | |
| *G06K 17/00* | (2006.01) | |
| *G06K 7/10* | (2006.01) | |
| *G06K 19/06* | (2006.01) | |
| *H04N 9/31* | (2006.01) | |

(52) U.S. Cl.
CPC ....... *G06K 7/1465* (2013.01); *G06K 7/10722* (2013.01); *G06K 7/1417* (2013.01); *G06K 7/1443* (2013.01); *G06K 17/0022* (2013.01); *G06K 19/06037* (2013.01); *H04N 9/3176* (2013.01)

(58) Field of Classification Search
CPC ............. G06K 7/1465; G06K 7/10722; G06K 7/1417; G06K 7/1443; G06K 17/0022; G06K 19/06037; H04N 9/3176
See application file for complete search history.

(56) References Cited

U.S. PATENT DOCUMENTS

| | | |
|---|---|---|
| 6,659,344 B2 | 12/2003 | Otto et al. |
| 7,003,138 B2 | 2/2006 | Wilson |
| 7,015,967 B1 | 3/2006 | Kochi et al. |

(Continued)

OTHER PUBLICATIONS

U.S. Appl. No. 17/118,793, filed Dec. 11, 2020, Patented, U.S. Pat. No. 11,301,661.

(Continued)

*Primary Examiner* — Matthew Mikels
(74) *Attorney, Agent, or Firm* — Alston & Bird LLP

(57) ABSTRACT

An encoded information reading (EIR) terminal can comprise a microprocessor, a memory, and an EIR device including a two-dimensional imager. The EIR device can be configured to output raw message data containing an encoded message and/or outputting a decoded message corresponding to an encoded message. The EIR terminal can be configured, responsive to acquiring an image containing decodable indicia, to pre-process the acquired image and transmit the pre-processed image to an external decoding computer for decoding the decodable indicia.

20 Claims, 6 Drawing Sheets

Related U.S. Application Data continuation of application No. 13/472,149, filed on May 15, 2012, now Pat. No. 9,558,386.

(56) References Cited

U.S. PATENT DOCUMENTS

| | | | |
|---|---|---|---|
| 7,159,770 B2 | 1/2007 | Onozu |
| 7,237,721 B2 | 7/2007 | Bilcu et al. |
| 7,287,696 B2 | 10/2007 | Attia et al. |
| 7,308,158 B2 | 12/2007 | Herbert et al. |
| 7,405,662 B2 | 7/2008 | Steinke et al. |
| 7,407,096 B2 | 8/2008 | McQueen et al. |
| 7,419,097 B2 | 9/2008 | Lee et al. |
| 7,480,737 B2 | 1/2009 | Chauffour et al. |
| 7,494,063 B2 | 2/2009 | Kotlarsky et al. |
| 7,501,950 B2 | 3/2009 | Suzuki |
| 7,535,361 B2 | 5/2009 | Doan et al. |
| 7,551,090 B2 | 6/2009 | Doan et al. |
| 7,602,288 B2 | 10/2009 | Broussard |
| 7,627,191 B2 | 12/2009 | Xu et al. |
| 7,677,602 B2 | 3/2010 | Bennett et al. |
| 7,696,874 B2 | 4/2010 | Stevens |
| 7,702,187 B2 | 4/2010 | Rusman et al. |
| 7,708,205 B2 | 5/2010 | Kotlarsky et al. |
| 7,735,731 B2 | 6/2010 | Skaaksrud et al. |
| 7,756,292 B2 | 7/2010 | Lev |
| 7,756,319 B2 | 7/2010 | Odell |
| 7,786,865 B2 | 8/2010 | Park |
| 7,786,925 B1 | 8/2010 | Knibbe et al. |
| 7,815,121 B2 | 10/2010 | Kotlarsky et al. |
| 7,821,400 B2 | 10/2010 | Tabet et al. |
| 7,831,082 B2 | 11/2010 | Holsing et al. |
| 7,831,912 B2 | 11/2010 | King et al. |
| 7,855,643 B2 | 12/2010 | Tuttle |
| 7,861,936 B2 | 1/2011 | Kotlarsky et al. |
| 7,870,999 B2 | 1/2011 | Skaaksrud et al. |
| 7,883,013 B2 | 2/2011 | Skaaksrud et al. |
| 7,886,972 B2 | 2/2011 | Skaaksrud et al. |
| 7,950,698 B2 | 5/2011 | Popadic et al. |
| 7,951,003 B2 | 5/2011 | Russell et al. |
| 7,961,908 B2 | 6/2011 | Tzur et al. |
| 7,965,186 B2 | 6/2011 | Downie et al. |
| 7,988,050 B2 | 8/2011 | Kitada et al. |
| 8,046,311 B2 | 10/2011 | Ferraro et al. |
| 8,079,525 B1 | 12/2011 | Zolotov |
| 8,087,583 B2 | 1/2012 | Hawes |
| 8,115,601 B2 | 2/2012 | Nonaka |
| 8,120,818 B2 | 2/2012 | Nagata |
| 8,139,117 B2 | 3/2012 | Dwinell et al. |
| 8,139,249 B2 | 3/2012 | Venable |
| 8,149,094 B2 | 4/2012 | Deoalikar et al. |
| 8,256,664 B1 | 9/2012 | Balfanz et al. |
| 8,485,430 B2 | 7/2013 | Qu et al. |
| 8,789,197 B1 | 7/2014 | Wolfram et al. |
| 9,558,386 B2* | 1/2017 | Yeakley | G06K 7/10722 |
| 10,882,291 B2 | 1/2021 | Dietrich et al. |
| 10,885,291 B2* | 1/2021 | Yeakley | G06K 7/1417 |
| 11,301,661 B2* | 4/2022 | Yeakley | G06K 7/1417 |
| 2001/0047426 A1 | 11/2001 | Hunter |
| 2002/0165758 A1 | 11/2002 | Hind et al. |
| 2005/0036185 A1 | 2/2005 | Gagliano et al. |
| 2005/0212817 A1 | 9/2005 | Cannon et al. |
| 2006/0262961 A1 | 11/2006 | Holsing et al. |
| 2006/0266836 A1 | 11/2006 | Bilcu et al. |
| 2007/0008136 A1 | 1/2007 | Suzuki |
| 2007/0063050 A1 | 3/2007 | Attia et al. |
| 2007/0102506 A1 | 5/2007 | Stevens |
| 2007/0199995 A1 | 8/2007 | Kotlarsky et al. |
| 2007/0215706 A1 | 9/2007 | Kotlarsky et al. |
| 2008/0037899 A1 | 2/2008 | Xu et al. |
| 2008/0061937 A1 | 3/2008 | Park |
| 2008/0111661 A1 | 5/2008 | Lin et al. |
| 2008/0164313 A1 | 7/2008 | Kotlarsky et al. |
| 2008/0164317 A1 | 7/2008 | Kotlarsky et al. |
| 2008/0169343 A1 | 7/2008 | Skaaksrud et al. |
| 2008/0172303 A1 | 7/2008 | Skaaksrud et al. |
| 2008/0173706 A1 | 7/2008 | Skaaksrud et al. |
| 2008/0173710 A1 | 7/2008 | Skaaksrud et al. |
| 2008/0203147 A1 | 8/2008 | Skaaksrud et al. |
| 2008/0203166 A1 | 8/2008 | Skaaksrud et al. |
| 2008/0210749 A1 | 9/2008 | Skaaksrud et al. |
| 2008/0210750 A1 | 9/2008 | Skaaksrud et al. |
| 2008/0224870 A1 | 9/2008 | Yeo et al. |
| 2008/0247363 A1 | 10/2008 | Lee et al. |
| 2008/0285091 A1 | 11/2008 | Skaaksrud et al. |
| 2009/0020611 A1 | 1/2009 | Sackett et al. |
| 2009/0021353 A1 | 1/2009 | Nonaka |
| 2009/0040025 A1 | 2/2009 | Volpi et al. |
| 2009/0045913 A1 | 2/2009 | Nelson et al. |
| 2009/0045924 A1 | 2/2009 | Roberts et al. |
| 2009/0109484 A1 | 4/2009 | Honda |
| 2009/0121025 A1 | 5/2009 | Romanchik |
| 2009/0161964 A1 | 6/2009 | Tzur et al. |
| 2009/0190183 A1 | 7/2009 | Hosoda |
| 2009/0214137 A1 | 8/2009 | Takahashi |
| 2009/0218405 A1 | 9/2009 | Joseph et al. |
| 2009/0243801 A1 | 10/2009 | Strzelczyk |
| 2009/0245755 A1 | 10/2009 | Lee et al. |
| 2009/0300106 A1 | 12/2009 | Woodside et al. |
| 2009/0307232 A1 | 12/2009 | Hall |
| 2009/0322537 A1 | 12/2009 | Tapp et al. |
| 2010/0045436 A1 | 2/2010 | Rinkes |
| 2010/0046842 A1 | 2/2010 | Conwell |
| 2010/0048242 A1 | 2/2010 | Rhoads et al. |
| 2010/0072269 A1 | 3/2010 | Scott et al. |
| 2010/0073487 A1 | 3/2010 | Sogoh et al. |
| 2010/0084470 A1 | 4/2010 | Scott et al. |
| 2010/0091313 A1 | 4/2010 | Kitada et al. |
| 2010/0109903 A1 | 5/2010 | Carrick |
| 2010/0142825 A1 | 6/2010 | Maxwell et al. |
| 2010/0148985 A1 | 6/2010 | Lin et al. |
| 2010/0163632 A1 | 7/2010 | Tseng et al. |
| 2010/0187311 A1 | 7/2010 | Van et al. |
| 2010/0189367 A1 | 7/2010 | Van et al. |
| 2010/0200660 A1 | 8/2010 | Moed et al. |
| 2010/0201488 A1 | 8/2010 | Stern et al. |
| 2010/0201520 A1 | 8/2010 | Stern et al. |
| 2010/0220894 A1 | 9/2010 | Ackley et al. |
| 2010/0226530 A1 | 9/2010 | Lev |
| 2010/0232712 A1 | 9/2010 | Tomita et al. |
| 2010/0250351 A1 | 9/2010 | Gillenson et al. |
| 2010/0250356 A1 | 9/2010 | Gillenson et al. |
| 2010/0250359 A1 | 9/2010 | Gillenson et al. |
| 2010/0252621 A1 | 10/2010 | Ito et al. |
| 2010/0260426 A1 | 10/2010 | Huang et al. |
| 2010/0271187 A1 | 10/2010 | Uysal et al. |
| 2010/0296753 A1 | 11/2010 | Ito et al. |
| 2010/0303348 A1 | 12/2010 | Tolliver et al. |
| 2010/0308964 A1 | 12/2010 | Ackley et al. |
| 2010/0327066 A1 | 12/2010 | Khan |
| 2011/0000958 A1 | 1/2011 | Herzig |
| 2011/0011936 A1 | 1/2011 | Morandi et al. |
| 2011/0019220 A1 | 1/2011 | Kikuchi |
| 2011/0019816 A1 | 1/2011 | Inami et al. |
| 2011/0026081 A1 | 2/2011 | Hamada et al. |
| 2011/0029363 A1 | 2/2011 | Gillenson et al. |
| 2011/0034176 A1 | 2/2011 | Lord et al. |
| 2011/0052008 A1 | 3/2011 | Holsing et al. |
| 2011/0081948 A1 | 4/2011 | Shirai et al. |
| 2011/0084808 A1 | 4/2011 | Tuttle |
| 2011/0102642 A1 | 5/2011 | Wang et al. |
| 2011/0115947 A1 | 5/2011 | Oh |
| 2011/0115950 A1 | 5/2011 | Wach |
| 2011/0128125 A1 | 6/2011 | Kai et al. |
| 2011/0143811 A1 | 6/2011 | Rodriguez |
| 2011/0155808 A1 | 6/2011 | Santos et al. |
| 2011/0200256 A1 | 8/2011 | Saubat et al. |
| 2011/0205387 A1 | 8/2011 | Tzur et al. |
| 2011/0207531 A1 | 8/2011 | Gagner et al. |
| 2011/0210171 A1 | 9/2011 | Brown et al. |
| 2011/0211726 A1 | 9/2011 | Moed et al. |
| 2011/0212717 A1 | 9/2011 | Rhoads et al. |
| 2011/0222757 A1 | 9/2011 | Yeatman et al. |
| 2011/0251093 A1 | 10/2011 | Xia et al. |
| 2011/0280447 A1 | 11/2011 | Conwell |

(56) References Cited

U.S. PATENT DOCUMENTS

| | | |
|---|---|---|
| 2011/0284625 A1 | 11/2011 | Smith et al. |
| 2011/0290883 A1 | 12/2011 | Kotlarsky et al. |
| 2011/0310442 A1 | 12/2011 | Popadic et al. |
| 2011/0311026 A1 | 12/2011 | Lalena |
| 2012/0037695 A1 | 2/2012 | Liu et al. |
| 2012/0047424 A1 | 2/2012 | Rothschild |
| 2012/0048920 A1 | 3/2012 | Iizaka |
| 2012/0063690 A1 | 3/2012 | Ashok et al. |
| 2012/0064971 A1 | 3/2012 | Devine et al. |
| 2012/0079544 A1 | 3/2012 | Massimino |
| 2012/0091204 A1 | 4/2012 | Shi |
| 2012/0142444 A1 | 6/2012 | Chol |
| 2012/0221724 A1 | 8/2012 | Chor |
| 2013/0092735 A1 | 4/2013 | Liu et al. |
| 2013/0142444 A1 | 6/2013 | Qu et al. |
| 2013/0194077 A1 | 8/2013 | Vargas et al. |
| 2013/0277427 A1 | 10/2013 | Zumsteg et al. |
| 2013/0277430 A1 | 10/2013 | Zumsteg et al. |
| 2013/0278386 A1 | 10/2013 | Zumsteg |
| 2013/0278393 A1 | 10/2013 | Zumsteg |
| 2013/0306720 A1 | 11/2013 | Todeschini et al. |
| 2014/0001254 A1 | 1/2014 | Williams et al. |
| 2014/0014724 A1 | 1/2014 | Koziol et al. |

OTHER PUBLICATIONS

U.S. Appl. No. 15/409,590, filed Jan. 19, 2017, Patented, U.S. Pat. No. 10,885,291.

U.S. Appl. No. 13/472,149, filed May 15, 2012, Patented, U.S. Pat. No. 9,558,386.

Advisory Action (PTOL-303) dated Feb. 10, 2015 for U.S. Appl. No. 13/472,149.

Advisory Action (PTOL-303) dated Jun. 25, 2018 for U.S. Appl. No. 15/409,590.

Advisory Action (PTOL-303) dated Nov. 10, 2015 for U.S. Appl. No. 13/472,149.

EPC Global, Specification for RFID Air Interface, EPC Radio-Frequency Identity Protocols Class-1 Generation-2 UHF RFID Protocol for Communications at 860 MHz-960 MHz, Version 1.0.9, Jan. 31, 2005, pp. 1-94.

Final Rejection dated Apr. 4, 2018 for U.S. Appl. No. 15/409,590.

Final Rejection dated Dec. 1, 2014 for U.S. Appl. No. 13/472,149.

Final Rejection dated Feb. 26, 2019 for U.S. Appl. No. 15/409,590.

Final Rejection dated Sep. 3, 2015 for U.S. Appl. No. 13/472,149.

Non-Final Office Action received for U.S. Appl. No. 17/118,793, dated Aug. 23, 2021, 6 pages.

Non-Final Rejection dated Jul. 23, 2014 for U.S. Appl. No. 13/472,149.

Non-Final Rejection dated Jun. 2, 2015 for U.S. Appl. No. 13/472,149.

Non-Final Rejection dated May 11, 2016 for U.S. Appl. No. 13/472,149.

Non-Final Rejection dated Oct. 24, 2017 for U.S. Appl. No. 15/409,590.

Non-Final Rejection dated Oct. 29, 2018 for U.S. Appl. No. 15/409,590.

Notice of Allowance and Fees Due (PTOL-85) dated Jan. 23, 2020 for U.S. Appl. No. 15/409,590.

Notice of Allowance and Fees Due (PTOL-85) dated Sep. 8, 2020 for U.S. Appl. No. 15/409,590.

Notice of Allowance and Fees Due (PTOL-85) dated Sep. 16, 2016 for U.S. Appl. No. 13/472,149.

Notice of Allowance received for U.S. Appl. No. 17/118,793, dated Dec. 8, 2021, 7 pages.

* cited by examiner

ENCODED INFORMATION READING TERMINAL CONFIGURED TO PRE-PROCESS IMAGES

CROSS-REFERENCE TO RELATED APPLICATIONS

The present application is a continuation of U.S. patent application Ser. No. 17/118,793 for Encoded Information Reading Terminal Configured to Pre-Process Images filed Dec. 11, 2020 (and published Apr. 22, 2021 as U.S. Patent Publication No. 2021/0117635), which is a continuation of U.S. patent application Ser. No. 15/409,590 for Encoded Information Reading Terminal Configured to Pre Process Images filed Jan. 19, 2017 (and published May 11, 2017 as U.S. Patent Publication No. 2017/0132444), now U.S. Pat. No. 10,885,291, which claims priority to and the benefit of U.S. patent application Ser. No. 13/472,149 for an Encoded Information Reading Terminal Configured to Pre-Process Images filed May 15, 2012 (and published Nov. 21, 2013 as U.S. Patent Publication No. 2013/0306736), now U.S. Pat. No. 9,558,386. Each of the foregoing patent applications, patent publications, and patents is hereby incorporated by reference in its entirety.

FIELD OF THE INVENTION

The invention is generally related to systems for decoding optical indicia and is specifically related to encoded information reading (EIR) terminals configured to pre-process images.

BACKGROUND

Barcodes are graphical representations of data, the most common of which are referred to as one dimensional (1D) and two dimensional (2D) barcodes. 1D barcodes are images that represent data by varying the widths and spacings of parallel lines. 2D barcodes are also images that represent data, but in addition to the parallel lines, or bars, a 2D barcodes may contain rectangles, dots, hexagons and other geometric patterns in two dimensions. The data encoded in the barcodes are interpreted by optical scanners and/or software. Barcodes can be scanned by special optical scanners called barcode readers as well as by general purpose devices such as smart phones.

SUMMARY

In one embodiment, there is provided an encoded information reading (EIR) terminal comprising a microprocessor, a memory, and an EIR device including a two-dimensional imager. The EIR device can be configured to output raw message data containing an encoded message and/or outputting a decoded message corresponding to an encoded message. The EIR terminal can be configured, responsive to acquiring an image containing decodable indicia, to determine the quality of the image using one or more methods of determining image quality. The EIR terminal can be further configured to transmit the image to an external computer for decoding the decodable indicia, responsive to ascertaining that the image quality satisfies a pre-determined or an adaptive condition.

In a further aspect, the image quality can be provided by an image quality metric calculated based on values of one or more image parameters. The image parameters can comprise sharpness, gamma, brightness, and/or contrast.

In a further aspect, the image quality metric can be calculated as a weighted sum of the image parameters. Alternatively, the image quality metric can be provided by an ordered set of two or more numeric values.

In a further aspect, the methods of determining image quality can comprise ascertaining a presence of decodable indicia within the image.

In another embodiment, there is provided an encoded information reading (EIR) terminal comprising a microprocessor, a memory, and an EIR device including a two-dimensional imager. The EIR device can be configured to output raw message data containing an encoded message and/or outputting a decoded message corresponding to an encoded message. The EIR terminal can be configured, responsive to acquiring an image containing decodable indicia, to scale the image using an adaptive scaling factor. The EIR terminal can be further configured to transmit the scaled image to an external computer for decoding the decodable indicia.

In a further aspect, the EIR terminal can be further configured to determine the adaptive scaling factor by performing one or more iterations comprising the following steps:
   i. scaling the image using the scaling factor;
   ii. transmitting the scaled image to the external computer; and
   iii. adjusting the scaling factor based on the decoding operation completion code received from the external computer.

In a further aspect, the above iterations can be performed until a successful decoding operation completion code is received from the external computer. In another embodiment, the iterations can be performed until the scaling factor reaches a pre-determined value.

In a further aspect, the scaling factor can be determined based on the values of one or more parameters of the image.

In a further aspect, the scaling factor can be determined based on the decoding operation completion codes received from the external computer responsive to decoding images having the value of at least one parameter falling within the pre-determined or dynamically calculated range of the value of the corresponding parameter of the image being processed.

In another embodiment, there is provided an encoded information reading (EIR) terminal comprising a microprocessor, a memory, and an EIR device including a two-dimensional imager. The EIR device can be configured to output raw message data containing an encoded message and/or outputting a decoded message corresponding to an encoded message. The EIR terminal can be configured, responsive to acquiring an image containing decodable indicia, to perform one or more iterations comprising the following steps:
   i. pre-processing the acquired image based on the value of at least one pre-processing parameter;
   ii. transmitting the pre-processed image to an external decoding computer for decoding the decodable indicia; and
   iii. adjusting a value of the at least one pre-processing parameter based on a decoding operation completion code received from the external computer.

In a further aspect, the above iterations are performed until a successful decoding operation completion code is received from the external computer.

In a further aspect, the values the pre-processing parameters can be adjusted based on the decoding operation completion codes received from the external computer responsive to decoding images having the value of at least one parameter falling within the pre-determined or dynamically calculated range of the value of the corresponding at least one parameter of the image.

In a further aspect, the EIR terminal can further comprising a wireless communication interface.

In one embodiment, the EIR terminal can be incorporated into a point-of-sale workstation. Alternatively the EIR terminal of claim 14, wherein the EIR terminal can be provided by a smart phone.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale, emphasis instead generally being placed upon illustrating the principles of the invention. In the drawings, like numerals are used to indicate like parts throughout the various views.

DETAILED DESCRIPTION

Figure 1:
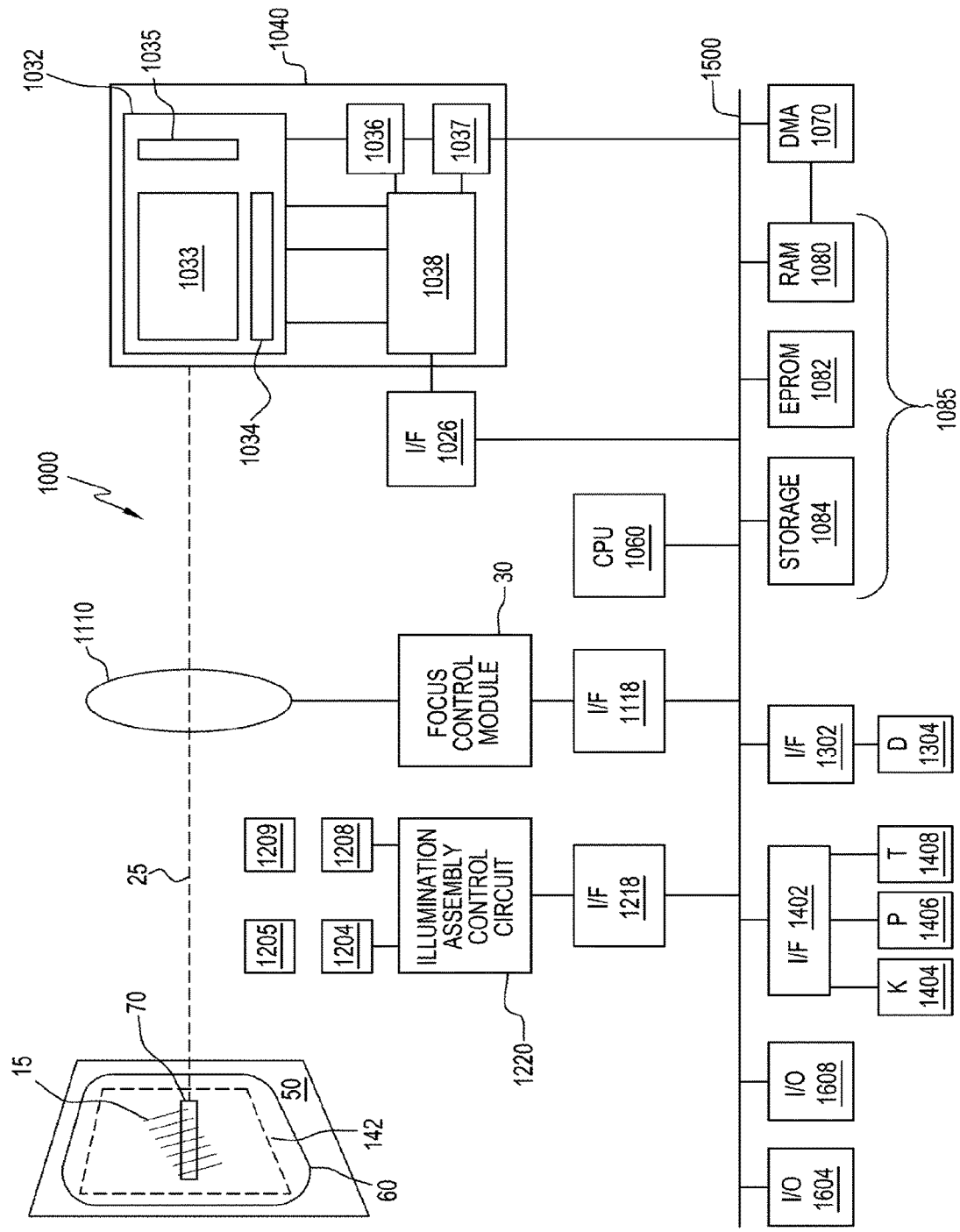
FIG. 1 is a block diagram illustrating an exemplary hardware platform for carrying out a method of acquiring and pre-processing an image by an FIR terminal.

A growing variety of devices are currently being used for bar code reading and decoding, ranging from specialized scanners to smart phones. Supporting multiple hardware and software platforms can become challenging for suppliers of decoding software. One solution to supporting a large number of bar code reading devices representing a variety of platforms is to split the imaging and decoding functions: an image comprising decodable indicia can be acquired by a portable or stationary scanner, e.g., by a point-of-sale (POS) device, and can then be transmitted to an external server for decoding. Since the imaging client can be completely agnostic with respect to decoding algorithms employed by the server, the problem of supporting a large variety of client platforms can be solved by creating thin client imaging applications. A typical thin client imaging application only needs to be able to transfer an image of decodable indicia to a decoding server over a network, and then receive decoded message data from the server. As used herein, "message" is intended to denote a character string comprising alphanumeric and/or non-alphanumeric characters. An encoded message can be used to convey information, such as identification of the source and the model of a product, for example, in a UPC code.

In a further aspect, the image acquiring device can determine the quality of an acquired image and transmit the image to the decoding server only the image quality satisfies a pre-determined or adaptive (i.e., dynamically adjustable) condition. In a further aspect, the quality of an acquired image can be determined by assigning a quality metric to the image based on the values of one or more image parameters. Alternatively, image quality can be determined based on ascertaining the presence of decodable indicia within the image. A skilled artisan would appreciate the fact that other methods of determining the image quality are within the scope of this disclosure.

In another embodiment, the image acquiring device can scale the acquired image using an adaptive (i.e., dynamically adjustable) scaling factor. In a further aspect, the scaling factor can be determined based on the feedback received from an external decoding computer: the image acquiring device can scale an acquired image using an initial value of the scaling factor and transmit the scaled image to the external computer for decoding the decodable indicia contained within the image. Responsive to receiving from the external computer a completion code indicating an unsuccessful decoding attempt, the scaling factor can be adjusted (e.g., by a pre-determined factor), and the image can be scaled using the new scaling facture of the scaling factor. The method can be repeated until a successful decoding operation completion code and/or a decoding result is received from the external computer, or the scaling factor reaches a pre-determined value (e.g., the value of 1).

In a further aspect, the image parameters (e.g., target values of the image gamma, brightness, and/or contrast) can be dynamically adjusted by the image acquiring device responsive to receiving a feedback from the external decoding server.

Thus, in one embodiment, there is provided an optical indicia decoding system comprising an imaging client computer (provided, e.g., by a portable EIR terminal) comprising an integrated and/or peripheral imaging device and one or more decoding computers executing one or more decoding processes. The imaging client and decoding computers can be mutually communicatively coupled via one or more communication networks. A "computer" herein shall refer to a programmable device for data processing, including a central processing unit (CPU), a memory, and at least one communication interface. For example, in one embodiment, a computer can be provided by an Intel-based server running Linux operating system. In another embodiment, a computer can be provided by a virtual server, i.e., an isolated instance of a guest operating system running within a host operating system. In another embodiment, a computer can be provided by a smartphone. A "communication network" or "network" herein shall refer to a set of hardware and software components implementing a plurality of communication channels between two or more computers. A network can be provided, e.g., by a local area network (LAN), or a wide area network (WAN). While different networks can be designated herein, it is recognized that a single network as seen from the network layer of the OSI model can comprise a plurality of lower layer networks, i.e., what can be regarded as a single Internet Protocol (IP) network, can include a plurality of different physical networks.

The imaging client can acquire an image containing decodable indicia (e.g., responsive to a user interface action). In one embodiment, the imaging client can determine the quality of an acquired image and transmit the image to the decoding server only the image quality satisfies a pre-determined or adaptive (i.e., dynamically adjustable) condition, as described in details herein infra. In another embodiment, the imaging client can scale the acquired image using an adaptive (i.e., dynamically adjustable) scaling factor, as described in details herein infra. In a further aspect, the image parameters can be dynamically adjusted by the image acquiring device responsive to receiving a feedback from the external decoding server. Responsive to receiving a decoding request including an image containing decodable indicia, the decoding process can decode the decodable indicia into a decoded message and transmit the decoded message and/or decoding operation completion result back to the imaging client.

In another aspect, there is provided an EIR terminal comprising an EIR device including a two-dimensional imager capable of acquiring an image of decodable indicia. It is not necessary that a device's primary function involve reading and/or decoding encoded information in order to be considered an FIR terminal; for example, a cellular telephone, a smart phone, a PDA, or other portable computing device that is capable of reading encoded information (e.g., bar codes) can be referred to as an EIR terminal for purposes of this disclosure. As noted herein supra, the EIR terminal can be configured to acquire an image of decodable indicia and transmit the image via a communication network to an external computer for decoding.

An exemplary hardware platform for carrying out the above described image acquiring and pre-processing by an EIR terminal is shown and described with reference to the block diagram of FIG. 1. The EIR terminal 100 can include an imaging device 1040 comprising an image sensor 1032. The image sensor 1032 can in turn comprise a multiple pixel image sensor array 1033 having pixels arranged in rows and columns, associated column circuitry 1034, and row circuitry 1035. In one embodiment, the image sensor 1032 can be provided by a charge-coupled device (CCD) image sensor. In another embodiment, the image sensor can be provided by a complementary metal-oxide semiconductor (CMOS) image sensor. A skilled artisan would appreciate the fact that other types of image sensors are within the scope of the invention.

Associated with the image sensor 1032 can be amplifier circuitry 1036 and an analog to digital converter 1037 configured to convert the image information in the form of analog signals read out of image sensor array 1033 into image information in the form of digital signals. The image sensor 1032 can also have an associated timing and control circuit 1038 to control the exposure period of image sensor 1032 and/or gain applied to the amplifier circuitry 1036. The noted circuit components 1032, 1036, 1037, and 1038 can be packaged into a common imaging device 1040.

The EIR terminal 100 can be configured to read out analog signals representative of light incident on one or more pixels. The read out analog signals can be amplified by the analog signal amplifier 1036. The analog signals can then be fed to the input of the ADC 1037. The resulting digital values representative of the analog signals can be stored in a system memory such as RAM 1080. The image frame data stored in RAM 1080 can be in the form of multi-bit pixel values, with each multi-bit pixel value representing light incident on a pixel of image sensor array 1033. A memory 1085 of terminal 1000 can include RAM 1080, a nonvolatile memory such as EPROM 1082 and a storage memory device 1084 such as may be provided by a flash memory or a hard drive memory.

The EIR terminal 100 can include a direct memory access unit (DMA) 1070 for routing image information read out from image sensor 1032 that has been subject to conversion and storage to RAM 1080. In another embodiment, terminal 1000 can employ a system bus providing for bus arbitration mechanism (e.g., a PCI bus) thus eliminating the need for a central DMA controller. Other embodiments of the system bus architecture and/or direct memory access components providing for efficient data transfer between the image sensor 1032 and RAM 1080 can be provided.

In another aspect, the EIR terminal 100 can include a variable focus imaging lens 1110 for use in focusing an image of a decodable indicia located within a field of view 142 on a substrate 50 onto image sensor array 1033. Imaging light rays can be transmitted about imaging axis 25. Variable focus imaging lens 1110 can be adapted to be capable of multiple best focus distances and multiple focal lengths.

The EIR terminal 100 can also include an illumination pattern light source bank 1204 for use in generating an illumination pattern 60 substantially corresponding to a field of view 142 of terminal 1000 and an aiming pattern light source bank 1208 for use in generating an aiming pattern 70 on substrate 50. Shaping optics 1205 and 1209 can be provided for shaping light from bank 1204 and bank 1208 into pattern 60 and into pattern 70 respectively. In use, terminal 1000 can be oriented by an operator with respect to a substrate 50 bearing decodable indicia 15 in such manner that aiming pattern 70 is projected on a decodable indicia 15. Each of illumination pattern light source bank 1204 and aiming pattern light source bank 1208 can include one or more light sources. Variable focus imaging lens 1110 can be controlled with use of focus control module 30 and the illumination assembly comprising illumination pattern light source bank 1204 and aiming pattern light source bank 1208 can be controlled with use of illumination assembly control module 1220. Focus control module 30 can send signals to variable focus imaging lens 1110 e.g., for changing a best focus distance and/or a focal length of variable focus imaging lens 1110. Illumination assembly control module 1220 can send signals to illumination pattern light source bank 1204 e.g., for changing a level of illumination output by illumination pattern light source bank 1204.

The EIR terminal 100 can also include a number of peripheral devices, e.g., a display 1304 for displaying such information as captured image frames, keyboard 1404, pointing device 1406, and trigger 1408 which may be used to make active a trigger signal 502 for activating frame readout and/or certain decoding processes. The EIR terminal 100 can be adapted so that activation of trigger 1408 activates trigger signal 502 and initiates acquiring an image of decodable indicia.

The EIR terminal 100 can also include various interface circuits for coupling the peripheral devices to system address/data bus (system bus) 1500, for communication with CPU 1060 which can also be coupled to system bus 1500. The EIR terminal 100 can include circuit 1026 for coupling image sensor timing and control circuit 1038 to system bus 1500, interface circuit 1118 for coupling focus control module 30 to system bus 1500, interface circuit 1218 for coupling illumination control assembly 1220 to system bus 1500, interface circuit 1302 for coupling display 1304 to system bus 1500, and interface circuit 1402 for coupling keyboard 1404, pointing device 1406, and trigger 1408 to system bus 1500.

In a further aspect, the EIR terminal 100 can include one or more I/O interfaces 1604, 1608 for providing communications with external devices (e.g., a decoding server or a peer terminal 100). I/O interfaces 1604, 1608 can be provided by any combination of known network interfaces, e.g., Ethernet (IEEE 802.3), USB, IEEE 802.11, Bluetooth, CDMA, GSM.

In another aspect, the EIR terminal 100 can include CPU 1060 which can be configured to execute one or more software processes. A "process" herein shall refer to an instance of a computer program that is being executed; in some operating systems, several processes can be instantiated simultaneously from the same computer program.

In one embodiment, one or more software processes can be configured to read out image data stored in memory 1080 and perform image pre-processing as described herein supra, transmitting one or more image for remote decoding, or performing local decoding. In one embodiment, at least some of the image pre-processing functions described herein supra can be performed by hardware modules and/or by a combination of hardware modules and software processes.

Figure 2A:
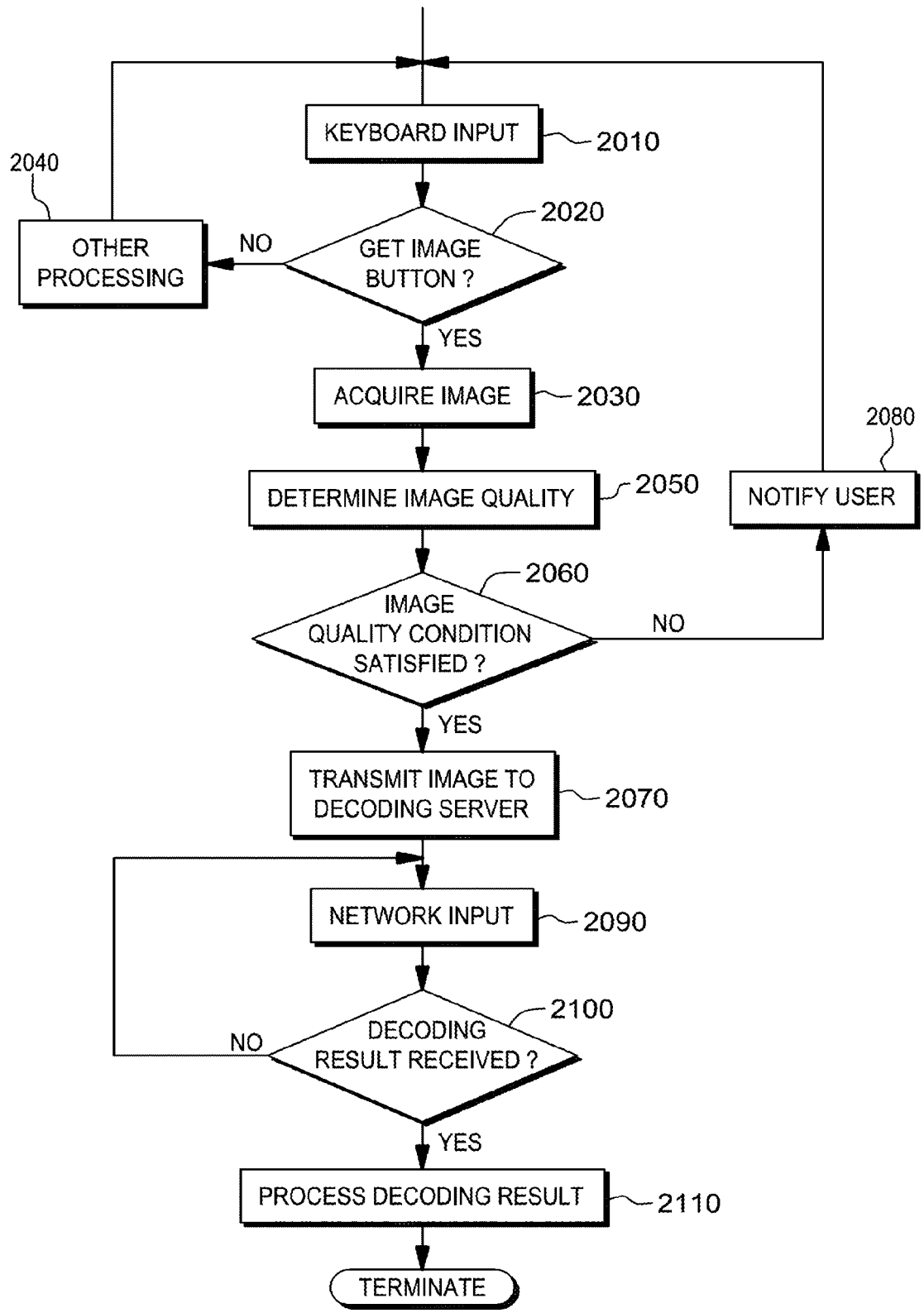
FIGS. 2a-2c depict flowcharts of various embodiments of a method of acquiring and pre-processing an image by an EIR terminal.

FIG. 2a depicts a flowchart of an illustrative embodiment of a method of acquiring and pre-processing an image by an EIR terminal.

At steps 2010-2020, EIR terminal 100 can perform a GUI input loop, and responsive to establishing at step 2020 that Get Image button has been pressed by the terminal's user, the processing can continue at step 2030; otherwise, the method can branch to step 2050. A skilled artisan would appreciate the fact that other ways of initiating an image acquiring operation are within the scope of this disclosure.

At step 2030, the EIR terminal can acquire an image of decodable indicia. The image of decodable indicia acquired by the EIR terminal can be provided by a raw image byte stream or a compressed image byte stream (e.g., GIFF, TIFF, JPEG or other standard or proprietary format).

At step 2050, the EIR terminal can determine the quality of the acquired image. In one embodiment, the quality of an acquired image can be determined by assigning a quality metric to the image based the values of one or more image parameters (for example, values of the image sharpness, gamma, brightness, and/or contrast). In a further aspect, the image quality can be calculated as a weighted sum of two or more image parameters; alternatively, the image quality can be represented as an ordered set of two or more numeric values, each representing a value of a pre-determined image parameter.

Alternatively, image quality can be determined based on ascertaining the presence of decodable indicia within the image. A skilled artisan would appreciate the fact that other methods of determining the image quality are within the scope of this disclosure.

Responsive to ascertaining, at step 2060, that the quality of the acquired image satisfies a chosen condition, the EIR terminal can, at step 2070, transmit the acquired image to an external server for decoding. In one embodiment, the condition to be ascertained at step 2060 can be provided by a pre-determined condition, for example, by specifying the threshold value of the image quality metric and the desired relation of the image quality to the threshold value (e.g., the image quality metric should be more or equal to 5). Alternatively, the condition to be ascertained at step 2060 can be provided by an adaptive condition, for example, by dynamically calculating the threshold value of the image quality metric, for example, based on the values of one or more parameters received from the decoding computer or via the user interface.

Responsive to ascertaining, at step 2060, that the quality of the acquired image does not satisfy a pre-determined or adaptive condition, the method can loop back to the GUI input loop 2010-2020. In one embodiment, a user can be notified of the unsatisfactory image quality at step 2080.

At steps 2090-2100, the EIR terminal can perform a network input loop, and responsive to establishing that a decoding result was received, process the received decoding result at step 2110.

In one embodiment, the decoding result can include one or more decoded messages and/or one or more decoding operation completion codes. The decoding operation completion code can, in one embodiment, contain a flag indicating whether the decoding operation was successful. Responsive to ascertaining that the decoding operation was successful, the EIR terminal can be configured to display the decoded message and/or transmit the decoded message to an external computer (e.g., transmitting a retail item identifier to a store server to retrieve the product information).

In one embodiment, the decoding operation completion code can contain an extended error code indicating the reason for the decoding operation failure, for example, failed to locate decodable indicia, decodable indicia symbol truncated, insufficient image resolution, etc. In one embodiment, the EIR terminal can be configured to display the error message corresponding to the extended error code.

After processing the decoding result at step 2110, the method can terminate.

Figure 2B:
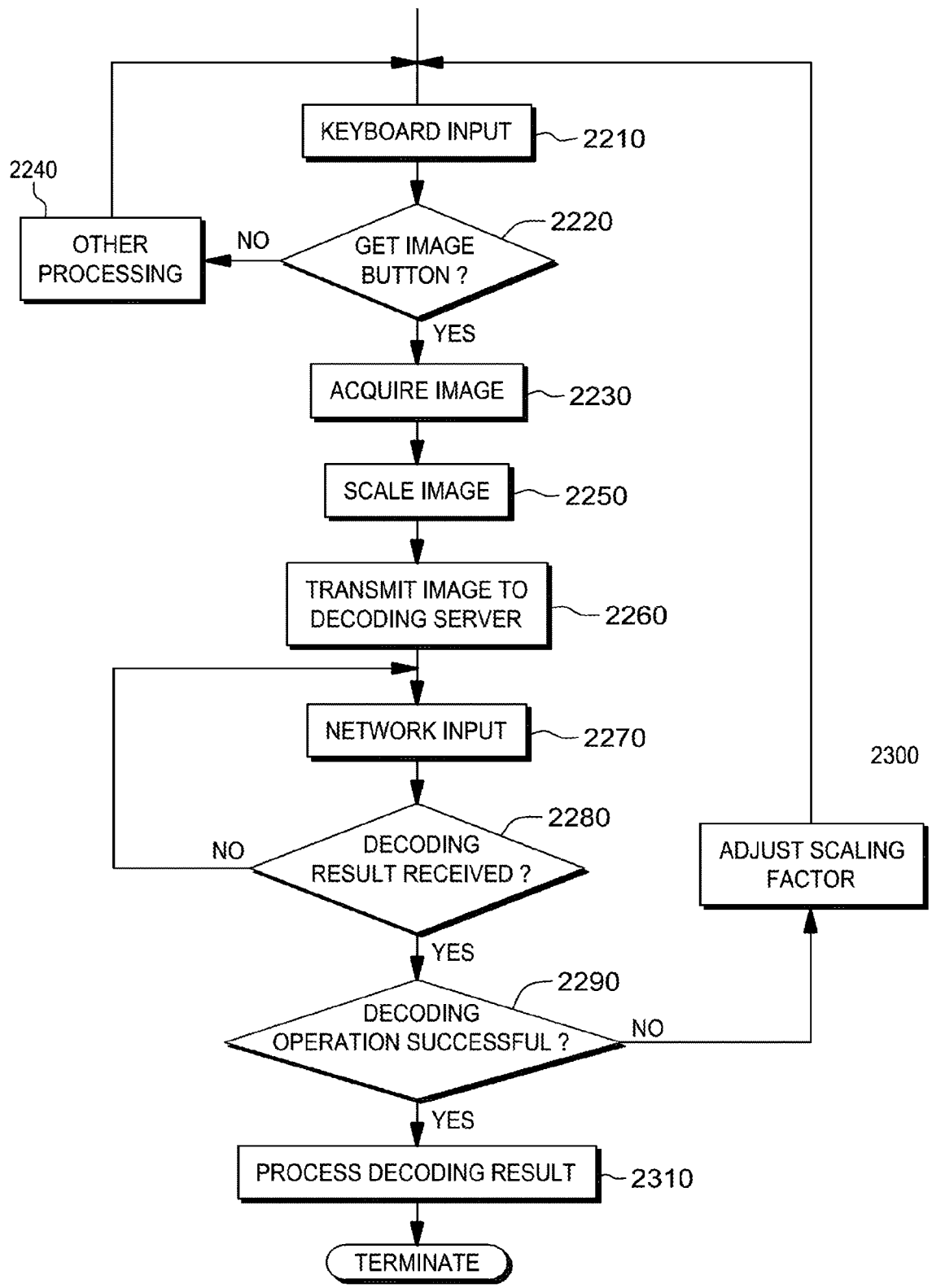

FIG. 2b depicts a flowchart of another illustrative embodiment of a method of acquiring and pre-processing an image by an EIR terminal.

At steps 2210-2220, EIR terminal 100 can perform a GUI input loop, and responsive to establishing at step 2220 that Get Image button has been pressed by the terminal's user, the processing can continue at step 2230; otherwise, the method can branch to step 2250. A skilled artisan would appreciate the fact that other ways of initiating an image acquiring operation are within the scope of this disclosure.

At step 2230, the EIR terminal can acquire an image of decodable indicia. The image of decodable indicia acquired by the EIR terminal can be provided by a raw image byte stream or a compressed image byte stream (e.g., GIFF, TIFF, JPEG or other standard or proprietary format).

At step 2250, the EIR terminal can scale the acquired image using a pre-determined or dynamically adjustable value of the scaling factor. In one illustrative embodiment, the EIR terminal can determine the scaling factor based on the values of one or more parameters of the image (e.g., image brightness, contrast, and/or sharpness). In another illustrative embodiment, the EIR terminal can determine the scaling factor based on one or more decoding operation completion codes received from the external decoding computer responsive to decoding images having similar properties. Two images can be considered to have similar properties a value of at least one parameter of the first image falls within a pre-determined range of the value of the same parameter of the second image. In a yet another illustrative embodiment, the range of the allowed parameter value variation can be calculated dynamically, for example, based on values of other parameters of the image.

At step 2260, the EIR terminal can transmit the resulting scaled image to an external computer for decoding.

At steps 2270-2280, the EIR terminal can perform a network input loop. Responsive to establishing that a decoding result was received, the EIR terminal can, at step 2290, analyze the decoding operation completion code to ascertain whether the decoding operation was successful.

Responsive to establishing at step 2290 that the decoding operation was successful, the processing can continue at step 2310; otherwise, the EIR terminal can, at step 2300, adjust the value of the scaling factor and loop back to step 2240. In a further aspect, the value of the scaling factor can be multiplied by a pre-defined value; alternatively, the scaling factor can be adjusted by a value received from the external computer, or by a value calculated based on the data received from the external computer. In one illustrative embodiment, the EIR terminal can adjust the scaling factor based on the values of one or more parameters of the image (e.g., image brightness, contrast, and/or sharpness). In another illustrative embodiment, the EIR terminal can adjust the scaling factor based on the values of one or more parameters of the image and the decoding operation completion codes received from the external decoding computer for images having similar properties.

At step 2310, the EIR terminal can process the received decoding result (e.g., display the decoded message and/or transmit the decoded message to an external computer, as described in details herein supra).

After processing the decoding result at step 2310, the method can terminate.

Figure 2C:
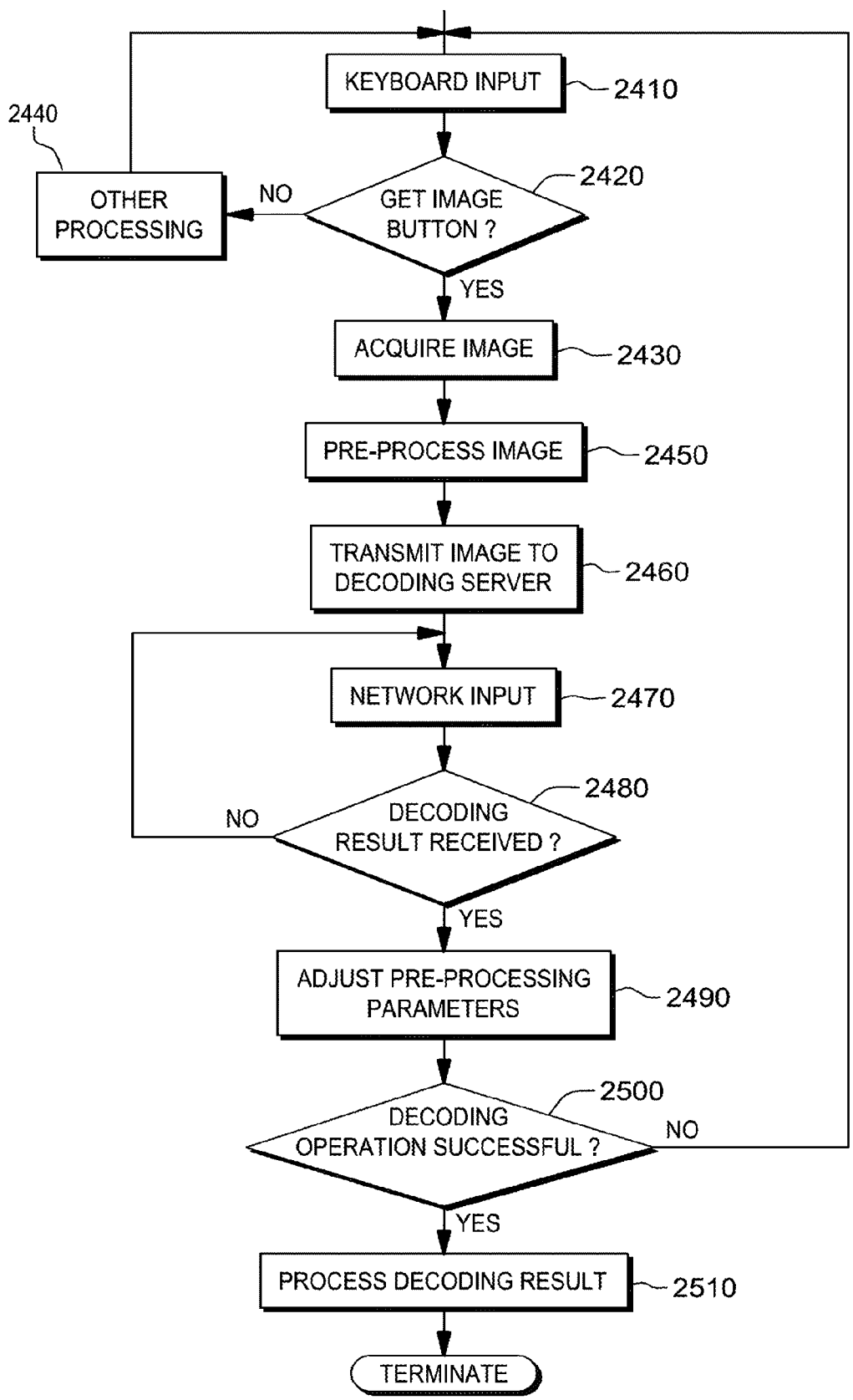

FIG. 2c depicts a flowchart of one illustrative embodiment of a method of acquiring and pre-processing an image by an EIR terminal.

At steps 2410-2420, EIR terminal 100 can perform a GUI input loop, and responsive to establishing at step 2420 that Get Image button has been pressed by the terminal's user, the processing can continue at step 2430; otherwise, the method can branch to step 2450. A skilled artisan would appreciate the fact that other ways of initiating an image acquiring operation are within the scope of this disclosure.

At step 2430, the EIR terminal can acquire an image of decodable indicia. The image of decodable indicia acquired by the EIR terminal can be provided by a raw image byte stream or a compressed image byte stream (e.g., GIFF, TIFF, JPEG or other standard or proprietary format).

At step 2450, the EIR terminal can pre-process the acquired image based on the values of one or more image parameters, for example, target image brightness, gamma, and/or contrast. In a further aspect, before processing the image, the EIR terminal can classify the image using one or more classification criteria, and then apply the processing parameters specific for the resulting image classification. For example, images can be classified into color and monochrome, with different processing parameters applied to monochrome and to color images. In another example, images can be classified into two or more groups based on the original image size, with different processing parameters applied to each of the groups based on the image size. In a yet another example, images can be classified in to two or more groups based on the original image brightness, with different processing parameters applied to each of the groups based on the image brightness. In a yet another example, images can be classified in to two or more groups based on the original image sharpness, with different processing parameters applied to each of the groups based on the image sharpness.

At step 2460, the EIR terminal can transmit the resulting scaled image to an external computer for decoding.

At steps 2470-2480, the EIR terminal can perform a network input loop. Responsive to establishing that a decoding result was received, the EIR terminal can, at step 2490, adjust the value of one or more pre-processing parameters. In one embodiment, a pre-processing parameter can be adjusted by a pre-defined value. In another embodiment, a pre-processing parameter can be adjusted by a value received from the external computer, or by a value calculated based on the data received from the external computer. The adjusted parameter values can be stored by the EIR terminal to be used for subsequently acquired images.

Responsive to establishing at step 2500 that the decoding operation was successful, the processing can continue at step 2510; otherwise, the method can loop back to step 2440.

At step 2510, the EIR terminal can process the received decoding result (e.g., display the decoded message and/or transmit the decoded message to an external computer, as described in details herein supra).

After processing the decoding result at step 2510, the method can terminate.

Figure 3:
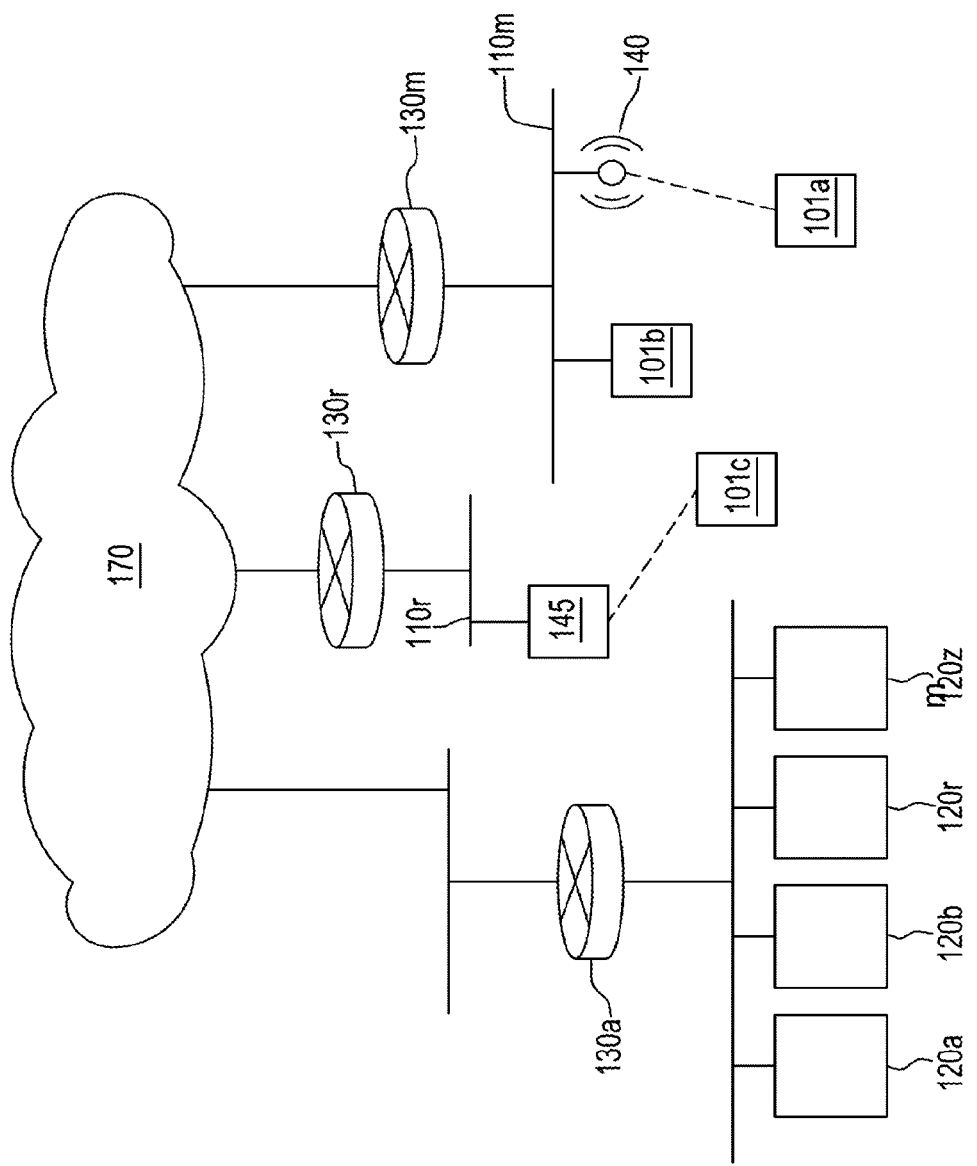
FIG. 3 schematically illustrates a component diagram of one embodiment of a data decoding system.

FIG. 3 schematically illustrates one embodiment of a decoding system described herein. The decoding system 1000 can comprise a plurality of computers 120a-120z communicatively coupled to a network 110a. Network 110a can be provided, e.g., by Ethernet-based local area network, and can be communicatively coupled to the Internet 170 via one or more routers 130a-130k and/or one or more networks 110b-110k. An imaging client 101a can be provided by a portable encoded information reading (FIR) terminal communicatively coupled to a local area network 110m via a wireless access point 140. Network 110m can be communicatively coupled to the Internet 170 via one or more routers 130m-130p and/or one or more networks 110m-110p. An imaging client 101b can be provided by an EIR terminal mounted into a POS workstation and can be communicatively coupled to the local area network 110m via an Ethernet communication interface. An imaging client 101c can be provided by a smart phone communicatively coupled to a provider's network 110r via a GSM/GPRS base station 145. Network 110r can be communicatively coupled to the Internet 170 via one or more routers 130r-130z and/or one or more networks 110s-110z.

In one embodiment, the decoding system 1000 can follow a cloud computing model, by providing an on-demand network access to a shared pool of configurable computing resources (e.g., servers, storage, applications, and/or services) that can be rapidly provisioned and released with minimal or no resource management effort, including interaction with the service provider, by the consumer (operator of a thin client). One characteristic of the cloud computing model is that a consumer can unilaterally provision computing capabilities, such as CPU power and storage capacity on the network, as needed automatically without requiring human interaction with the service's provider. The resources of the cloud can be accessed by thin clients over a network.

In another aspect, imaging clients can access cloud-based decoding applications executed by computers 120a-120z via a single point of entry, e.g., via a single IP address or uniform resource identifier (URI). In one embodiment, the single point of entry IP address can be assigned to a load balancing component provided, e.g., by router 130a or by a dedicated load balancer 120r. In another embodiment, the single point of entry URI can include a fully-qualified host name resolvable by a DNS server into one or more IP addresses of computers 120a-120z. In a yet another embodiment, the single point of entry URI can include a fully-qualified host name resolvable by a DNS server into an IP address of the dedicated load balancer 120r which can act as a server-side HTTP proxy by forwarding HTTP requests from the imaging clients 101a-101z to HTTP processes running on the decoding computers 120a-120z. The server-side HTTP proxy can preserve HTTP or application-level sessions by forwarding all TCP packets from one client to the same server. Thus, an imaging client accessing the cloud-based decoding applications can be agnostic with respect to the number of computers 120a-120z, topology of the local area networks 110a-110b, aspects of load balancing among the computers 120a-120z and other server-side implementation details.

For preventing unauthorized access to the cloud-based decoding services, decoding system 1000 can require an imaging client to be authenticated before processing any decoding requests.

In a further aspect, a decoding process can, responsive to completing a decoding operation, transmit the decoding operation result including decoded message data and/or the decoding operation completion code to the imaging client.

The decoding operation completion code can, in one embodiment, contain a flag indicating whether the decoding operation was successful. In another embodiment, the decoding operation completion code can contain the number of decoding attempts performed. In a yet another embodiment, the decoding operation completion code can contain an extended error code indicating the reason for the decoding operation failure, for example, failed to locate decodable indicia, decodable indicia symbol truncated, insufficient image resolution, etc.

In a further aspect, a decoding request transmitted by the imaging client can comprise one or more client configuration parameters, for example, client device model, client device serial number, aperture value, shutter speed, and ISO value. In one embodiment, one or more client configuration parameters (e.g., aperture value, shutter speed, and ISO value) can be used as input parameters for decoding algorithms.

In another aspect, the imaging client can be provided by a large variety of imaging devices. In one embodiment, the imaging client can be provided by a mobile computing device (e.g., an encoded information reading (EIR) terminal, or a smartphone) comprising an integrated imaging device or a peripheral imaging device. An integrated imaging device can be provided, e.g., by a two-dimensional imager incorporated into the housing of the mobile computing device and communicatively coupled to other components of the mobile computing device, including, e.g., a data bus, a processor or a communication interface. A peripheral imaging device can be provided, e.g., by a still image or video camera disposed in a separate housing and communicatively coupled to the mobile computing device (e.g., via Bluetooth interface).

In another embodiment, the imaging client can be provided by a general purpose computing device (e.g., a notebook computer or a desktop computer) comprising an integrated imaging device or a peripheral imaging device. In a yet another embodiment, the imaging client can be provided by a computing device by a computing device integrated into a POS system (e.g., a retail cashier's workstation) comprising an integrated imaging device or a peripheral imaging device. As noted herein supra, in one embodiment, the imaging client can be provided by an encoded information reading (EIR) terminal.

Figure 4:
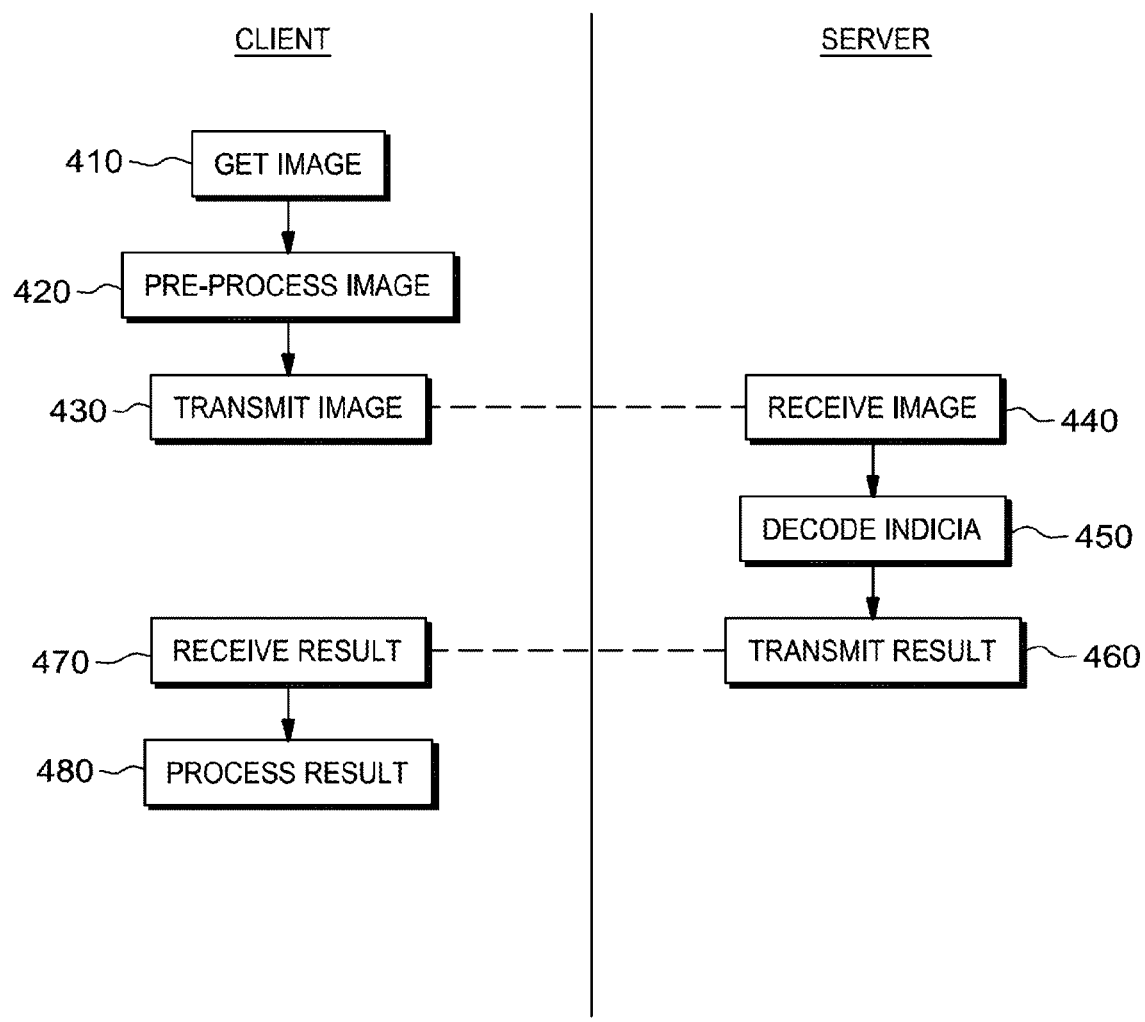
FIG. 4 depicts a flowchart of one embodiment of a method of decodable indicia decoding by the data decoding system.

FIG. 4 depicts a flowchart of one embodiment of a method of decodable indicia decoding by the above described data decoding system.

At step 410, an imaging client can acquire an image containing decodable indicia.

At step 420, the imaging client can pre-process the acquired image. In one embodiment, the pre-processing can comprise filtering images based on the image quality, as described in details herein supra. In another embodiment, the pre-processing can include scaling the acquired image, as described in details herein supra. In a further aspect, the pre-processing parameters can be dynamically adjusted based on one or more decoding operation completion codes received by the imaging client from a decoding server.

At step 430, the imaging client can transmit the pre-processed image to a decoding server over a communication network.

At steps 440-450, responsive to receiving the image, the decoding server can locate and decode the decodable indicia.

At step 460, the decoding server can transmit the decoding result to the imaging client over a communication network In one embodiment, the decoding result can include one or more decoded messages and/or one or more decoding operation completion codes. The decoding operation completion code can contain a flag indicating whether the decoding operation was successful. In one embodiment, the decoding operation completion code can contain an extended error code indicating the reason for the decoding operation failure, for example, failed to locate decodable indicia, decodable indicia symbol truncated, insufficient image resolution, etc.

At steps 470-480, responsive to receiving the decoding result the imaging client can process the result, e.g., by displaying the decoded message and/or transmitting the decoded message to an external computer (e.g., transmitting a retail item identifier to a store server to retrieve the product information). After processing the decoding result at step 4080, the method can terminate.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

A small sample of systems, methods, and apparata that are described herein is as follows:

A1. An encoded information reading (EIR) terminal comprising:

a microprocessor;

a memory;

an EIR device including a two-dimensional imager, said EIR device configured to perform one of: outputting raw message data containing an encoded message, outputting a decoded message corresponding to an encoded message;

wherein said EIR terminal is configured, responsive to acquiring an image containing decodable indicia, to determine a quality of said image using one or more methods of determining image quality; and wherein said EIR terminal is further configured to transmit said image to an external computer for decoding said decodable indicia, responsive to ascertaining that said quality of said image satisfies one of: a pre-determined condition, an adaptive condition.

A2. The EIR terminal of (A1), wherein said image quality is provided by an image quality metric calculated based on values of one or more image parameters.

A3. The EIR terminal of (A2), wherein said one or more image parameters comprise at least one of: a sharpness of said image, a gamma of said image, a brightness of said image, and a contrast of said image.

A4. The EIR terminal of (A2), wherein said image quality metric is calculated as a weighted sum of said one or more image parameters.

A5. The EIR terminal of (A2), wherein said image quality metric is provided by an ordered set of two or more numeric values.

A6. The EIR terminal of (A1), wherein said one or more methods of determining image quality comprise ascertaining a presence of decodable indicia within said image.

A7. The EIR terminal of (A1), further comprising a wireless communication interface.

B1. An encoded information reading (EIR) terminal comprising:

a microprocessor;

a memory;

an EIR device including a two-dimensional imager, said EIR device configured to perform one of: outputting raw message data containing an encoded message, outputting a decoded message corresponding to an encoded message;

wherein said EIR terminal is configured, responsive to acquiring an image containing decodable indicia, to scale said image using an adaptive scaling factor; and wherein said EIR terminal is further configured to transmit said scaled image to an external computer for decoding said decodable indicia.

B2. The EIR terminal of (B1), wherein said EIR terminal is further configured to determine said adaptive scaling factor by performing one or more iterations comprising the following steps:

(i) scaling said image using said scaling factor;

(ii) transmitting said scaled image to said external computer; and (iii) adjusting said scaling factor based on a decoding operation completion code received from said external computer.

B3. The EIR terminal of (B2), wherein said iterations are performed until a successful decoding operation completion code is received from said external computer.

B4. The EIR terminal of (B2), wherein said iterations are performed until said scaling factor reaches a pre-determined value.

B5. The EIR terminal of (B1), wherein said scaling factor is determined based on values of one or more parameters of said image.

B6. The EIR terminal of (B1), wherein said scaling factor is determined based on one or more decoding operation completion codes received from said external computer responsive to decoding images having a value of at least one parameter falling within a pre-determined range of a value of a corresponding at least one parameter of said image.

B7. The EIR terminal of (B1), wherein said scaling factor is determined based on one or more decoding operation completion codes received from said external computer responsive to decoding images having a value of at least one parameter falling within a dynamically calculated range of a value of a corresponding at least one parameter of said image.

B8. The EIR terminal of (B1), wherein said EIR terminal is incorporated into a point-of-sale workstation.

C1. An encoded information reading (EIR) terminal comprising:

a microprocessor;

a memory;

an EIR device including a two-dimensional imager, said EIR device configured to perform one of: outputting raw message data containing an encoded message, outputting a decoded message corresponding to an encoded message;

wherein said EIR terminal is configured, responsive to acquiring an image containing a decodable indicia, to perform one or more iterations comprising the following steps:

(i) pre-processing said acquired image based on a value of at least one pre-processing parameter;

(ii) transmitting said pre-processed image to an external decoding computer for decoding said decodable indicia; and (iii) adjusting a value of said at least one pre-processing parameter based on a decoding operation completion code received from said external computer.

C2. The EIR terminal of (C1), wherein said iterations are performed until a successful decoding operation completion code is received from said external computer.

C3. The EIR terminal of (C1), wherein said value of said at least one pre-processing parameter is adjusted based on one or more decoding operation completion codes received from said external computer responsive to decoding images having a value of at least one parameter falling within a pre-determined range of a value of a corresponding at least one parameter of said image.

C4. The EIR terminal of (C1), wherein said value of said at least one pre-processing parameter is adjusted based on one or more decoding operation completion codes received from said external computer responsive to decoding images having a value of at least one parameter falling within a dynamically calculated range of a value of a corresponding at least one parameter of said image.

C5. The EIR terminal of (C1), wherein said EIR terminal is provided by a smart phone.

The invention claimed is:

1. An encoded information reading (EIR) terminal comprising:

a memory;

a processor coupled to the memory; and an EIR device including a two-dimensional imager, wherein, responsive to acquiring an image comprising a decodable indicia, the processor is configured to perform iterations of:

(i) pre-process the acquired image based on a value of at least one pre-processing parameter;

(ii) transmit the pre-processed image to an external computer for decoding the decodable indicia; and (iii) adjust the value of the at least one pre-processing parameter based on a decoding operation completion code received from the external computer.

2. The EIR terminal of claim 1, wherein the iterations are performed until a successful decoding operation completion code is received from the external computer.

3. The EIR terminal of claim 1, wherein the value of the at least one pre-processing parameter is adjusted based on one or more decoding operation completion codes received from the external computer responsive to decoding images having a value of the at least one pre-processing parameter falling within a pre-determined range.

4. The EIR terminal of claim 1, wherein the value of the at least one pre-processing parameter is adjusted based on one or more decoding operation completion codes received from the external computer responsive to decoding images having a value of the at least one pre-processing parameter falling within a dynamically calculated range.

5. The EIR terminal of claim 1, wherein the EIR terminal is a smart phone.

6. The EIR terminal of claim 1, wherein pre-processing the acquired image comprises filtering images based on the image quality.

7. The EIR terminal of claim 1, wherein the processor is further configured to, prior to transmitting the pre-processed image to the external computer, determine that a quality of the acquired image satisfies a predetermined condition.

8. The EIR terminal of claim 7, wherein the predetermined condition corresponds to a threshold value of an image quality metric that is determined based on the value of the at least one pre-processing parameter.

9. The EIR terminal of claim 7, wherein the processor is further configured to acquire at least one other image comprising the decodable indicia, in response to determining that the quality of the acquired image does not satisfy the predetermined condition.

10. A method comprising:
acquiring an image comprising decodable indicia with an encoded information reading (EIR) device including a two-dimensional imager;
responsive to acquiring the image, performing iterations of:
(i) pre-processing the acquired image based on a value of at least one pre-processing parameter;
(ii) transmitting the pre-processed image to an external computer for decoding the decodable indicia; and
(iii) adjusting the value of the at least one pre-processing parameter based on a decoding operation completion code received from the external computer.

11. The method of claim 10, wherein the iterations are performed until a successful decoding operation completion code is received from the external computer.

12. The method of claim 10, wherein the value of the at least one pre-processing parameter is adjusted based on one or more decoding operation completion codes received from the external computer responsive to decoding images having a value of the at least one pre-processing parameter falling within a pre-determined range.

13. The method of claim 10, wherein the value of the at least one pre-processing parameter is adjusted based on one or more decoding operation completion codes received from the external computer responsive to decoding images having a value of the at least one pre-processing parameter falling within a dynamically calculated range.

14. The method of claim 10, wherein pre-processing the acquired image comprises filtering images based on the image quality.

15. The method of claim 10, further comprising, prior to transmitting the pre-processed image to the external computer, determining that a quality of the acquired image satisfies a predetermined condition.

16. The method of claim 15, wherein the predetermined condition corresponds to a threshold value of an image quality metric that is determined based on the value of the at least one pre-processing parameter.

17. The method of claim 15, further comprising acquiring at least one other image comprising the decodable indicia, in response to determining that the quality of the acquired image does not satisfy the predetermined condition.

18. A non-transitory computer readable medium storing computer executable instructions thereon, that in response to execution by a processor, perform operations comprising:
acquiring an image comprising decodable indicia;
responsive to acquiring the image, performing iterations of:
(i) pre-processing the acquired image based on a value of at least one pre-processing parameter;
(ii) transmitting the pre-processed image to an external computer for decoding the decodable indicia; and
(iii) adjusting the value of the at least one pre-processing parameter based on a decoding operation completion code received from the external computer.

19. The non-transitory computer readable medium of claim 18, wherein the computer executable instructions, in response to execution by the processor, perform operations further comprising:
prior to transmitting the pre-processed image to the external computer, determining that the quality of the acquired image satisfies a predetermined condition, wherein the predetermined condition corresponds to a threshold value of an image quality metric.

20. The non-transitory computer readable medium of claim 19, wherein the computer executable instructions, in response to execution by the processor, perform operations further comprising acquiring at least one other image comprising the decodable indicia, in response to determining that the quality of the acquired image does not satisfy the predetermined condition.

* * * * *